Patented Aug. 1, 1939

2,167,629

UNITED STATES PATENT OFFICE 2,167,629

METHOD OF APPLYING GUMMED TAPE, LABELS, AND THE LIKE

Hans F. Bauer and Jordan V. Bauer, Chicago, and Don M. Hawley, Geneva, Ill., assignors to Stein, Hall Manufacturing Company, Chicago, Ill., a corporation of Delaware No Drawing. Application August 10, 1938, Serial No. 224,111

12 Claims. (Cl. 216—62)

This invention relates to an improved type of amylaceous remoistening adhesive and an improved means of utilizing the same.

By the term "amylaceous adhesives" we refer to those types of adhesives which are prepared from starches and starch degradation products such as dextrins or starch gums.

By the term "remoistening adhesives" we refer to those types of adhesives which are applied to a paper or fabric surface in aqueous solution or suspension and dried to form a sheet of paper or fabric coated with a potentially adhesive film, which on being remoistened will immediately develop tackiness and act as a suitable adhesive for bonding the paper or fabric to other materials. Although at present large amounts of gummed paper suitable for such purposes as labels, stamp and envelope seals are prepared with dextrin adhesives, dextrin adhesives have never been successful in replacing animal glue adhesives in the field of gummed tape for sealing the heavier types of boxes or for gummed paper or fabric which is to be used for purposes wherein it is required that the adhesive coating on being moistened will develop immediate strong adhesive properties and set up very rapidly to form a bond.

One of the objects of the invention is to provide a new and improved type of amylaceous remoistening adhesive of such exceptional adhesive strength that in addition to being used for such purposes as prior types of amylaceous remoistening adhesives are used, it will also be suitable for such purposes wherein it has heretofore only been practical to use animal or fish glue remoistening adhesives.

Another object of our invention is to provide a new means of utilizing to a greater extent the adhesive properties of amylaceous remoistening adhesives. Other objects will appear hereinafter.

Up to the present time the only amylaceous remoistening adhesives that have proved to any extent commercially practical are those prepared from highly soluble tapioca, sago, sweet potato and potato starch dextrins. Maize, wheat and rice starch dextrin adhesives have not been found commercially satisfactory for this purpose due largely to an inherent lack of immediate tackiness when the dry adhesive film is remoistened.

Although the manufacturers of amylaceous adhesives and the manufacturers of gummed papers and fabric have had many years of experience in the use and preparation of amylaceous remoistening adhesives for label, stamp and envelope work they have up to the present been unable to develop a dextrin adhesive of this type or a method of using such adhesives which could successfully be used to replace the higher grades of animal glues normally used for the stronger types of gummed papers and fabrics suitable for box sealing and splicing types.

The stimuli for the intensive work which has been done on this problem lies in the relatively low cost of amylaceous adhesives as compared to adhesives prepared from animal glues.

The reason for the supremacy of animal glue remoistening adhesives in the field of the stronger types of gummed paper or fabrics is due to the fact that they develop extreme tackiness immediately on being remoistened, do not tend to slip or slide on the surface to which they are applied even under conditions of considerable tension or sidewise pressure, and have sufficient cohesiveness while still wet to hold surfaces together which would normally tend to spring apart.

Some manufacturers of gummed paper in order to produce a product of desirable low cost and yet retain to a degree the superior adhesive properties of animal glues sometimes incorporate a proportion of dextrin with the animal glue. These mixtures, however, are usually inferior in adhesive properties to the straight animal or fish glue adhesives.

We have discovered a means of preparing and a method of using amylaceous remoistening adhesives whereby they are rendered greatly superior to prior types of amylaceous remoistening adhesives and which are even superior in quality and performance to the best grades of animal glue remoistening adhesives. We accomplish the ultimate result of our invention by a twofold means, either of which means, however, is of value in itself, but when used together they are supplementary and of additive value.

The first means by which we accomplish this result is by an improvement in the composition of the adhesive itself. The second and supplementary means by which we accomplish this result is by dissolving a proportion of borax or similar water-soluble borate salts in the water used for remoistening the amylaceous adhesive film. This second or supplementary means is not only of value in conjunction with our improved adhesive composition, but also is of value when used in conjunction with prior types of amylaceous remoistening adhesives.

In addition to borax, various other materials such as alkalis, wetting agents, solvents, etc. may also be incorporated with the remoistening water. Sodium aluminate and similar soluble aluminates will function somewhat similarly to borax for this purpose. Generically, therefore, this feature of our invention involves the addition of a viscosity increasing agent for amylaceous dispersions to the remoistening water.

It is well known to the adhesive art that the addition of borax to dextrin or starch gum adhesives increases their tackiness and viscosity. Because of this fact, a great percentage of the dextrin and starch gum adhesives used today wherein the adhesive is applied in liquid or paste form and allowed to dry, in situ, between the surfaces to be bonded, contain borax or mixtures of borax with other alkaline materials. Up to the present, however, it has not been practical to use borax in those types of dextrin or strach gum adhesives which are used for remoistening purposes due to the fact that when films of dextrin or starch gum adhesives containing borax are dried, they do not develop sufficient tackiness or adhesiveness rapidly enough on being remoistened to be suitable for such purposes as to which gummed papers or fabrics are applied.

Inasmuch as the characteristic of developing adhesiveness immediately upon being remoistened is one of the essential and necessary features of a remoistening adhesive, it has not been possible by prior methods to incorporate in amylaceous remoistening adhesives the desirable characteristics which borax imparts to those types of amylaceous adhesives which are applied at the point of use in liquid form.

If, however, as taught by our invention, borax is introduced into the adhesive film on a piece of gummed paper or fabric by incorporating it with the water used to remoisten the film rather than by incorporating it with the adhesive mixture before it is applied to the paper or fabric and dried, the difficulties formerly encountered in using borax with amylaceous remoistening adhesives are avoided and yet the advantages of its use are attained. The introduction of borax by this means into the adhesive film just prior to the actual usage of the gummed paper or fabric greatly increases the rapidity with which the adhesive sets to form a bond without detracting from the important characteristic of developing immediate adhesiveness on being moistened with the borax solution.

These results and others are illustrated herein by means of tests made with the McLaurin gummed tape tester.

We have found that for the purposes of our improved type of amylaceous remoistening adhesive it is very important to prepare the proper type of adhesive base. The most satisfactory base for this purpose we have found to be an incompletely dextrinized starch or British gum converted to a solubility of from 70% to 95% in water at 75° F. and a dextrin content of less than 55% as determined by the method of Babington, Tingle & Watson. See "The Examination of Commercial Dextrin and Related Starches", Babington, Tingle & Watson—J. Soc. Chem. Ind 37 (1918) 257.

By the term "British gum" we refer to those types of starch degradation products that are formed by roasting or heating starch without or at the most, with very small amounts of acid catalysts as differentiated from dextrins which are formed from starch by roasting or heating the starch with relatively larger amounts of acid catalysts. The differentiation between dextrins and British gum is well recognized in the art of adhesive manufacture. See "Manufacture of Dextrin, Envelope Gums, British Gums, and Modified Starches", Victor G. Bloede, page 167, Comprehensive Survey of Starch Chemistry, vol. 1, Walton.

It is known to the adhesive art that British gums and incompletely dextrinized starches give stronger and tougher adhesive films than those types of dextrin products which have been more completely dextrinized. It heretofore has not been possible, for the purpose of remoistening adhesives, to take full advantage of these desirable properties of sols prepared from British gum or incompletely dextrinized starches, probably due to the tendency of the more incompletely degraded portions of these materials to retrograde to a less soluble state, which when in the form of a dried film will not remoisten with sufficient rapidity to be suitable for those usages to which remoistening adhesives are applied.

We have found, however, by the use of an amylaceous adhesive base material within the solubility range and dextrin content above specified, in conjunction with from 3% to 20% of urea it is possible to prepare a remoistening adhesive which has superior adhesive properties and yet remoistens with the extreme rapidity that is necessary for adhesives of this type. The urea apparently functions as a solvent for the more incomplete degraded portions of the amylaceous base material and counteracts the retrogradation of this portion to a less soluble form. In general, the greater the solubility of the adhesive base used, the smaller the amount of urea necessary for satisfactory results.

The uniqueness of this result is shown herein by comparative tests on the McLaurin gummed tape tester which is the recognized instrument used in the industry for the purpose of comparing gummed tapes adhesives.

Its novelty may be further confirmed by a survey of the remoistening adhesives in present day commercial use for the purpose of manufacturing the stronger types of gummed paper. It will be found that only animal and fish glues, and to a lesser degree, mixtures of animal glue with dextrin that have the requisite remoistening properties and the extreme tackiness and rapidity of set that are necessary for this purpose.

For the purposes of our invention the urea may be mixed with the adhesive composition before it is applied to the paper or fabric or it may be introduced into the dried adhesive film by dissolving a proportion of urea in the water used for remoistening the gummed paper or fabric prior to its actual use. Examples of both of these methods of procedure are given herein.

We have also discovered that by the use of urea with an amylaceous remoistening adhesive a small proportion of borax may be incorporated into the adhesive formula with a resultant favorable effect on its adhesive properties but without the detrimental effect on the remoistening properties of the adhesive film that is normally encountered when borax is incorporated with prior types of amylaceous remoistening adhesives not containing urea. When borax is thus used in our adhesive composition, we prefer to use less than 5% borax based on the weight of amylaceous content of the adhesive composition and to avoid over drying the adhesive film after it has been applied to the paper or fabric. If glycerine is used in the adhesive formula, a greater proportion of borax than the above mentioned amount may be used.

By the use of the specifically defined combination of materials we herein disclose we are able to produce a remoistening adhesive equivalent in adhesive properties to the better grades of animal glue remoistening adhesives. This result has, to our knowledge, never before been attained with any prior type of amylaceous remoistening adhesives. Furthermore, by the use in conjunction with the above adhesive combination the second or supplementary means of our invention, namely, the introduction of borax into the water used to remoisten the adhesive film, it is possible to obtain adhesive results definitely superior to animal glue remoistening adhesives.

We realize the use of urea in conjunction with far decomposed dextrins, and in certain instances with starches, is not new. We believe, however, that our use of urea in conjunction with a British gum and/or an incompletely dextrinized starch of the type we herein define, is novel for the purposes of a remoistening adhesive and produces new and improved results.

For the purposes of our invention it is necessary to use a specific type of starch conversion product with a limited range of water solubility and dextrin content.

The unique results of our invention cannot be obtained by the mere use of urea in conjunction with any random type of degraded or dextrinized starch product. The prior art, to our knowledge, does not teach the value or use of urea and a starch degradation product, within the range we define, for the purposes of a superior remoistening adhesive.

We, therefore, claim as novel over the prior art not only the adhesive compositions herein disclosed, but also the disclosed supplementary means of introducing borax into the adhesive films of amylaceous remoistening adhesives by dissolving a portion of borax in the water used for remoistening the adhesive film.

We illustrate below several of our preferred adhesive formulas and a comparison of their adhesive properties with other types of remoistening adhesives as indicated by the McLaurin gummed tape tester. The adhesive samples were prepared in the manner specified and applied to 60 lb. kraft paper under uniform conditions equivalent to present commercial practice. The prepared samples of tape were then tested under uniform conditions on the McLaurin gummed tape tester according to the method specified by the Thwing-Albert Instrument Company, Philadelphia, Pennsylvania, makers of the above instrument.

The readings obtained with the better grades of animal glue tape run as an average between 45 and 65 when using the same test paper as was used in the examples below:

Example I

| | Parts |
|---|---|
| Tapioca British gum | 100 |
| Urea | 10 |
| Glycerine | 5 |
| Water | 95 |

The above materials were mixed together and cooked to a temperature of 190° F. The mixture was then cooled to 80° F. and applied to the paper and dried. The British gum used was one having a solubility of 85% in water at 75° F. and a dextrin content of 36% as determined by the method of Babington, Tingle & Watson.

The McLaurin tests on tape prepared with this adhesive composition averages about 55 when the tape is moistened with water and 90 when moistened with a saturated borax solution.

Example II

| | Parts |
|---|---|
| Tapioca dextrin | 100 |
| Urea | 10 |
| Glycerine | 5 |
| Water | 70 |

The above materials were mixed together and cooked to a temperature of 190° F. and then cooled to 80° F., applied to the paper and dried.

The tapioca dextrin used was one having a solubility of 98% in water at 75° F. and a dextrin content, as above determined, of 96%.

The McLaurin test on tape prepared with this adhesive composition averaged about 14 when moistened with water and about 23 when moistened with a saturated borax solution.

A comparison of Examples I and II indicates the importance of using an amylaceous base material of the type defined.

Example III

| | Parts |
|---|---|
| Tapioca British gum | 97 |
| Borax | 3 |
| Urea | 15 |
| Glycerine | 5 |
| Water | 95 |

The above materials were mixed together and cooked to a temperature of 190° F. and then cooled to 80° F., applied to the paper and dried. The British gum used was of the same characteristics as that used in Example I.

The McLaurin test on tape prepared with the above adhesive composition average 77 when moistened with water and 97 when moistened with a saturated borax solution.

This example illustrates the possibilities of incorporating a small amount of borax into the adhesive composition in conjunction with urea and glycerine. When borax is incorporated directly into the adhesive composition in this manner it is advisable to avoid over-drying the tape, as this will tend to decrease the rapidity with which the adhesive film will remoisten and develop tackiness.

Example IV

| | Parts |
|---|---|
| Tapioca British gum | 100 |
| Glycerine | 10 |
| Water | 90 |

The above materials were mixed together and cooked to 190° F. and then cooled to 80° F., applied to the paper and dried.

The tapioca British gum used in this example is of the same solubility and dextrin content as that used in Examples I and III.

The McLaurin tests on tape prepared with this adhesive composition average about 60 when the tape was moistened with a 10% solution of urea in water and 89 when moistened with a water solution containing 10% urea and 4% borax.

This example illustrates the means whereby urea may be introduced into the adhesive film by dissolving a portion of it in the moistening water instead of incorporating it in the adhesive composition before it is applied to the paper. If this procedure is followed, it is advisable to use a greater proportion of glycerine or similar plasticizing material in the adhesive than would be necessary if the urea had been originally incorporated with the adhesive composition.

Example V

| | Parts |
|---|---|
| Tapioca dextrin | 100 |
| Glycerine | 5 |
| Water | 70 |

The above materials were mixed together and cooked to 190° F., then cooled to 80° F., applied to the paper and dried. The tapioca dextrin used in this example is of the same solubility and dextrin content as that used in Example II.

The McLaurin tests on tape prepared with the above composition average 16 when the tape was moistened with water and 29 when it was moistened with a saturated borax solution.

This example of an amylaceous remoistening adhesive is typical of the prior art practice in preparing adhesives of this type. Although the adhesive properties as indicated by the McLaurin test are inferior to those of our improved types of adhesive compositions illustrated in Examples I, III and IV, it should be noted that by the use of our supplementary means of incorporating borax in the remoistening water, the adhesive properties of such prior art types of adhesives can be substantially improved.

It should be understood that these various examples of adhesive formulae given above are for the purpose of illustrating the novel character of our invention and for the purpose of making clear the principle and the relative value of the means by which we obtain our result. We, therefore, do not wish to be limited by the specific examples herein disclosed inasmuch as numerous variations may be made in the character of the adhesive base, and in the proportion of other ingredients used, without departing from the limits we define as essential for the purposes of our invention.

Various plasticizing agents, wetting agents, solvents, anti-foaming agents and filling materials may be used in conjunction with our preferred adhesive means for the purpose of obtaining those special effects for which the use of such materials is known to the adhesive art. Instead of glycerine, other plasticizing agents may be employed in adhesive of the types described in the examples, as, for instance, other polyhydric alcohols, including ethylene glycol, diethylene glycol and the like. The term "a water-soluble urea" is employed herein to cover generically urea and its water-soluble analogues and homologues including thiourea.

In such instances where it is desirable, our disclosed adhesive compositions may be mixed with compatible adhesive materials such as animal glue, fish glue, casein, starch, natural gums and water-soluble natural or synthetic resins.

For the purpose of our improved type of adhesive we prefer to use amylaceous base materials, of the type defined, prepared from tapioca, sago, potato and sweet potato starches. Corn, wheat and rice starches may be utilized for our purposes with substantially good results, but they are inherently not as satisfactory for our purpose as those starches first enumerated.

We do not wish to limit the usage of invention merely to the field of gummed tape inasmuch as it is also of value as an adhesive coating for such purposes as stamps, label papers and envelope seals. In joining two surfaces together by our method, the moistening solution containing borax or other viscosity increasing agent may be applied to the non-adhesive surface instead of the adhesive surface, provided the non-adhesive surface is not too absorbent. While our invention is especially useful for joining paper to paper, paper to cardboard, etc. it may be used for joining together other widely differing types of materials.

With regard to the disclosed supplementary means of utilizing to a greater extent the adhesive properties of amylaceous remoistening adhesives, namely, by the use of borax in water used to remoisten the adhesive film, we do not wish to be construed to the effect that this means is of value only when used in conjunction with our improved adhesive composition, inasmuch as it is also of value when used with prior types of amylaceous remoistening adhesives.

We furthermore do not wish to be construed to the effect that the use of this supplementary means is essential to the success of our improved type of adhesive composition inasmuch as our adhesive composition is novel and of great value in itself, regardless of whether or not the supplementary means is also employed.

Having thus described the invention, what we claim as new and desire to secure by Letters Patent of the United States is:

1. A method of joining two surfaces together which comprises placing a water-soluble amylaceous adhesive upon one surface, drying said adhesive, moistening the dried adhesive with a wetting solution containing a viscosity increasing agent for amylaceous dispersions, and joining the surfaces together.

2. A method of joining two surfaces together which comprises placing a water-soluble amylaceous adhesive upon one surface, drying said adhesive, moistening the dried adhesive with a solution containing borax and joining the two surfaces together.

3. In the art of applying gummed tape having an amylaceous, water-soluble adhesive dried thereon, the step which comprises moistening said dried adhesive with a solution containing a viscosity increasing agent for amylaceous dispersions, and applying the tape.

4. In the art of applying gummed tape having an amylaceous, water-soluble adhesive dried thereon, the steps which comprise moistening said dried adhesive with a solution containing a soluble borate, and applying the tape.

5. In the art of applying gummed tape having an amylaceous, water-soluble adhesive dried on at least one face thereof, the steps which comprise moistening said dried adhesive with an aqueous solution of borax, and applying the tape.

6. A method of labelling which comprises placing an amylaceous, water-soluble adhesive on one face of a label, drying said adhesive, moistening the dried adhesive with a solution containing borax, and applying the label.

7. A method of joining a strip of paper to another paper material which comprises placing a water solublie, amylaceous adhesive upon one face of the strip of paper, drying said adhesive, moistening the dried adhesive with a solution containing borax and then joining the moistened paper to the other paper material.

8. That improvement in methods of applying gummed tape which comprises placing a water-soluble, amylaceous adhesive comprising an amylaceous substance and a plasticizing agent in water upon one face thereof, drying said adhesive, moistening the dried adhesive with a solution containing a viscosity increasing agent, and then applying the tape.

9. That improvement in methods of applying gummed tape which comprises placing a water-soluble, amylaceous adhesive containing a polyhydric alcohol plasticizing agent upon one face thereof, drying said adhesive, moistening the dried adhesive with a solution containing borax and a water-soluble urea and then applying the tape.

10. That improvement in methods of applying gummed tape which comprises placing a water-soluble, amylaceous adhesive made from a British gum upon one face thereof, drying said adhesive, moistening the dried adhesive with a solution containing borax, and then applying the tape.

11. That improvement in methods of applying gummed tape which comprises placing a water-soluble, amylaceous adhesive consisting essentially of a British gum and urea dispersed in water upon one face thereof, drying said adhesive, moistening the dried adhesive with a solution containing borax, and then applying the tape.

12. That improvement in methods of applying gummed tape which comprises placing a water-soluble, amylaceous adhesive consisting essentially of a British gum and glycerine in water upon one face thereof, drying said adhesive, moistening the dried adhesive with a solution containing borax and urea, and then applying the tape.

HANS F. BAUER.
JORDAN V. BAUER.
DON M. HAWLEY.